United States Patent [19]

Johnson et al.

[11] 4,298,389
[45] Nov. 3, 1981

[54] HIGH TRANSMISSION GLASSES FOR SOLAR APPLICATIONS

[75] Inventors: Lauren K. Johnson, Corning; David A. Thompson, Horseheads, both of N.Y.

[73] Assignee: Corning Glass Works, Corning, N.Y.

[21] Appl. No.: 123,047

[22] Filed: Feb. 20, 1980

[51] Int. Cl.$^3$ .............................................. C03C 3/08
[52] U.S. Cl. ..................................... 501/77; 65/134; 65/135
[58] Field of Search ............................... 65/134, 135; 106/DIG. 8, 54

[56] References Cited

U.S. PATENT DOCUMENTS

| | | | |
|---|---|---|---|
| 1,488,914 | 4/1924 | Gelstharp | 65/134 X |
| 1,830,904 | 11/1931 | Hood | 106/54 |
| 2,877,124 | 3/1959 | Welsch | 106/54 |

*Primary Examiner*—Arthur D. Kellogg
*Attorney, Agent, or Firm*—Clinton S. Janes, Jr.

[57] ABSTRACT

The instant invention is directed to glasses manifesting solar transmissions (350–2100 nm) through a 2.54 mm thick sheet in excess of 90% which can be prepared from conventional glass batch materials containing up to 0.1% iron, expressed as $Fe_2O_3$, as impurities. The inventive glasses consist essentially, expressed in weight percent on the oxide basis as calculated from the batch, of

| | |
|---|---|
| $Al_2O_3$ | 7–13 |
| $B_2O_3$ | 7–10 |
| $Na_2O$ | 6–11 |
| $K_2O$ | 2–7 |
| CaO | 2–7 |
| $TiO_2$ | 0.1–1 |
| $As_2O_3$ | 0–1 |
| $Sb_2O_3$ | 0–1 |
| $SiO_2$ | Balance |

Part of the batch materials is added in the form of nitrates in a sufficient amount to virtually completely oxidize all the tramp iron present to the $Fe^{+3}$ state.

2 Claims, No Drawings

HIGH TRANSMISSION GLASSES FOR SOLAR APPLICATIONS

BACKGROUND OF THE INVENTION

The solar transmission ($T_s$) of typical soda-lime glass is about 85%. For certain applications, for example, a solar heliostat glass for backside reflecting mirrors, glasses demonstrating greater solar transmissions would be highly desirable. Moreover, it has been recognized that some glass formulations are prone to develop discoloration ("browning") therein after exposure to radiation, this coloration reducing the overall solar transmission of the glass. An interaction occurring between the glass and the radiation can cause electronic changes in the glass. If the source of the radiation is sunlight, the changes are commonly referred to as resulting from solarization. Solarization reactions within a glass appear to be caused by a transfer of electrons taking place between ions capable of donating and accepting charges. Damage to the glass network may also occur when the glass is exposed to very high energy radiation. However, such damage is beyond the scope of solarization. In any event, glasses subject to substantial solarization are self-evidently not useful for solar applications where high transmissions are demanded.

The spectral transmission of soda-lime glass over the visible region ($\sim 400-780$ nm) is essentially transparent for most applications and certainly "clear" to the eye unless long light path lengths are used such as, for example, viewing a large article "edge on". The coloration of glass, when observed, is normally the result of contamination arising from the presence of tramp iron oxides in the composition. These iron oxides customarily have their source as contaminants in such batch ingredients as sand, feldspars, limestone, etc., or they may be inadvertently picked up during batch and cullet handling.

The iron oxide conventionally contains ferrous ($Fe^{+2}$) and ferric ($Fe^{+3}$) ions with characteristic absorptions in the near infrared region of the radiation spectrum, i.e., about 1100 nm, and in the ultraviolet region, i.e., about 380 nm. The presence of a high percentage of $Fe^{+3}$ ions gives rise to a yellow to yellow-green coloration, whereas the presence of substantial amounts of $Fe^{+2}$ ions yields a blue coloration and causes the glass to absorb strongly in the infrared region. A typical soda-lime glass contains about 0.1% iron, expressed as $Fe_2O_3$, with about 30% of the iron content being present in the $Fe^{+2}$ state. The desire to transmit solar energy is not limited to the visible portion of the spectrum. Rather, the need is for high transmission over the spectral region of 350–2100 nm. Consequently, the strong absorption by $Fe^{+2}$ ions in the near infrared portion of the spectrum is undesirable.

Numerous drawing processes are known to the art wherein glass sheet is formed directly from a melt and, in most of those processes, the surfaces of the glass sheet are not contacted by molds or rollers until after the glass has cooled sufficiently to resist surface marking. Three of the most widely known of those processes are the Colburn process, the Fourcault process, and the Pittsburgh Plate or Pennvernon process. Each operation utilizes rollers to draw sheet up from a glass melt but can provide glass of near-optical quality and without surface markings. A recently-developed downdraw process is described in U.S. Pat. Nos. 3,338,696 and 3,682,609 which is especially suitable for forming glass sheet of controlled uniform thickness and optical quality.

Unfortunately, however, each of those sheet drawing processes requires holding large volumes of glass at relatively low temperatures to secure the necessary sheet forming viscosities, viz., about $10^4$–$10^6$ poises. Moreover, those volumes of molten glass are required to be in extended contact with the refractory metals or ceramics utilized as the means for forming the drawn sheet. Accordingly, then, those processes impose severe constraints on operable glass compositions because of the formidable liquidus and glass stability problems associated with the handling and processing of glass at relatively low temperatures and high viscosities.

Because of its inherent capability to produce glass sheet of optical quality, the aforementioned recently-developed downdraw process is especially useful to produce glass sheet destined for solar applications or other utility where high transmission is the goal. That process requires a glass exhibiting a viscosity at its liquidus temperature of at least $10^4$ poises and preferably about $10^5$ poises, and demonstrating long term stability against devitrification and interfacial crystallization in contact with platinum and such refractory ceramics as mullite, sillimanite, zircon, and high density alumina-containing refractories customarily employed to contain or form the molten glass. The growth of a crystalline layer at the glass-refractory metal or ceramic interface not exceeding 10 microns in thickness over a contact period of 30 days when the glass melt is at a viscosity between about $10^4$–$10^6$ poises is deemed to be good long term stability.

Furthermore, inasmuch as a discoloration arising from solarization can be deleterious to the transmission of the glass, additives known to inhibit the action of that phenomenon will be advantageously included in the glass compositions.

Finally, because the primary application for the glasses involves exposure thereof to solar radiation in the ambient environment, good chemical durability and, in particular, high resistance to weathering is demanded.

OBJECTIVE OF THE INVENTION

The principal objective of the instant invention is to provide glass compositions, demonstrating solar transmissions (350–2100 nm) through a 2.54 mm thick sheet of at least 89% and, most preferably, in excess of 90%, which can be prepared from standard glass batch materials, i.e., the iron content therein expressed as $Fe_2O_3$ can be as high as about 0.1%, and which have a viscosity at the liquidus between about $10^4$–$10^6$ poises, exhibit long term stability against devitrification when in contact with platinum and refractory ceramics, are virtually unaffected by solarization, and display excellent resistance to weathering.

SUMMARY OF THE INVENTION

The most obvious step to improve the solar transmission of an iron-containing glass is to reduce the amount of iron present. Such practice can, of course, be undertaken by utilizing extremely pure batch materials. However, it is equally evident that such practice will greatly increase the cost of the final product.

Our inventive glasses rely upon a second approach to the problem, viz., to oxidize the ferrous iron to ferric iron. It is not apparent that this action will aid in improving the transmission of the glass since the energy of solar radiation is near maximum in the ultraviolet-visible region of the spectrum. The absorption coefficient of $Fe^{+2}$ ions, however, is greater than that of $Fe^{+3}$ ions and the absorption peak is broader. Measurements have confirmed that, for a specified total iron concentration, an oxidized glass will transmit more total solar energy (350–2100 mm) than a reduced or partially reduced formulation.

Accordingly, the accomplishment of the above objective is founded in the development of compositions capable of achieving the other desired chemical, physical, and forming properties and including ingredients in the batch which will effectively oxidize the glass to convert $Fe^{+2}$ ions to $Fe^{+3}$ ions. In this manner, the $T_s$ can be significantly improved even though the total iron level is relatively high. The invention removes the need to resort to scarce and very expensive low iron-containing raw materials. The oxidation of the glass is achieved through the addition of nitrates to the batch and, if fining of the molten batch is necessary, to utilize $As_2O_3$ or, perhaps, $Sb_2O_3$ to perform that function. The amount of nitrates necessary to essentially completely oxidize all the iron impurities to the $Fe^{+3}$ state, i.e., in excess of 80% and preferably more than 90% of the iron will be present in the $Fe^{+3}$ state, is, of course, dependent upon the total iron present. This can be calculated from the analyses of the batch materials.

The glass art has recognized that $TiO_2$ is one of the most effective inhibitors of solarization in glass. That material is also incorporated here for that purpose.

In summary, glasses capable of satisfying the above objective consist essentially, expressed in weight percent on the oxide basis as calculated from the batch, of

| | |
|---|---|
| $Al_2O_3$ | 7–13 |
| $B_2O_3$ | 7–10 |
| $Na_2O$ | 6–11 |
| CaO | 2–7 |
| $K_2O$ | 2–7 |
| $TiO_2$ | 0.1–1 |
| $As_2O_3$ | 0–1 |
| $Sb_2O_3$ | 0–1 |
| $Fe_2O_3$ | no more than about 0.1 |
| $SiO_2$ | Balance |

No iron is purposefully added to the batch. The amount noted, calculated in terms of $Fe_2O_3$, represents contaminants present in the batch materials. Sufficient nitrates, commonly in the form of $NaNO_3$ or $KNO_3$, will be included in the glass batch to oxidize $Fe^{+2}$ ions to $Fe^{+3}$. The $NO_2$ is essentially totally expelled from the melt so, therefore, is not reported in the above recital of operable glass compositions.

$Al_2O_3$ imparts unusual viscosity behavior to the glass and generally improves the water durability thereof. Adjusting the $Al_2O_3$ concentration provides an optimum for weatherability, liquidus temperature, and glass viscosity.

Higher $B_2O_3$ levels permit the preparation of glasses having lower coefficients of thermal expansion through the removal of alkali metal oxides from the compositions. A low coefficient of thermal expansion is not necessary for the designed application of this invention, however, and will not be desirable due to expansion mismatches with soda-lime glass in those structures where the inventive glasses are bonded to soda-lime glasses. In such applications, a coefficient of thermal expansion over the temperature range of $-30°$ C. to $+50°$ C. of about $60-80\times 10^{-7}/°$ C. will be preferred.

CaO increases the melting rate of the glasses by providing a fluxing action. As the melt cools, higher CaO concentrations cause the glasses to "set up faster", i.e., have a steeper viscosity-temperature curve, than low CaO or CaO-free glasses. Nevertheless, care must be exhibited to avoid the development of pseudowollastonite ($CaSiO_3$) devitrification. At levels below about 5% CaO, the liquidus viscosity is satisfactory for forming glass sheet utilizing the above-described downdraw process without the formation of crystals.

$Na_2O$ and $K_2O$ perform as fluxes to secure easier melting and are highly effective as controls for the expansion and viscosity characteristics demonstrated by the glasses. Whereas higher alkali contents soften the glass for easier melting, the durability (weathering resistance) of the glass deteriorates substantially. On a weight percent basis, $Na_2O$ reduces the durability of the glass more than does $K_2O$.

Borosilicate glasses are frequently refined utilizing chloride-containing batch ingredients. These materials appear to function by releasing a chlorine-containing gas, e.g., $Cl_2$, HCl, etc., through the molten batch. We have determined that a combination of nitrates with $As_2O_3$ and/or $Sb_2O_3$ will not only effectively refine the inventive glass compositions, but will also oxidize the melt to virtually eliminate the absorption of the $Fe^{+2}$ state of iron that remains in the glass.

The preferred compositions will exhibit a solar transmission through a 2.54 mm thick sheet in excess of 90%, a liquidus viscosity in excess of $10^5$ poises, a softening point of no more than 760° C., an annealing point of no more than about 575° C., a strain point of no more than about 535° C., and better durability and weathering resistance than soda-lime glass.

DESCRIPTION OF THE PREFERRED EMBODIMENTS

Table I following reports several glasses, expressed in terms of parts by weight of the oxide basis as calculated from the batch, exemplary of the inventive compositions. The batch ingredients utilized were standard materials of glass manufacture, either the oxide or other compounds, which, when melted together with the other components, were converted to the desired oxide in the proper proportions. Because the sum of the individual constituents totals or approximately totals 100, for all practical purposes the values recited may be deemed to reflect weight percent. The $Fe_2O_3$ content is estimated from the batched compositions. Inasmuch as it is not known with which cation(s) the fluoride is associated, it is simply reported as fluoride in accordance with conventional glass analysis practice.

The batch ingredients for the exemplary glasses were compounded, ballmilled together to assist in obtaining a homogeneous melt, and placed into platinum crucibles. After covering with a lid, the crucibles were moved to a furnace operating at 1550° C. and the batches melted for about 6 hours with occasional stirring. The melts were then poured into steel molds to form glass slabs having dimensions of about $6''\times 6''\times \frac{1}{2}''$ and those slabs immediately transferred to an annealer operating at 575°–600° C.

Although the above description involved laboratory scale melting, it will be appreciated that the molten glass may be formed employing any of the techniques well recognized in the glassmaking art such as blowing, casting, pressing, rolling, and spinning. Furthermore, the glasses are sufficiently stable from devitrification that they may also be formed into sheet by direct drawing from the melt and, particularly advantageously, direct drawing utilizing the downdraw method described above where platinum and/or other refractory ceramic forming means are used.

Table I also records the analysis of a commercial soda-lime glass made via the float glass process (F Glass) and a commercial aluminosilicate glass (AS Glass).

method, designation C225, and measures a weight percent equivalent of $Na_2O$. A typical soda-lime glass has a weight loss equivalent to be about $400 \times 10^{-4}\%$ in this test. Finally, Table II recites the solar transmission (Solar) over the 350–2100 nm range of wavelength of several samples both before (Pre) and after (Post) a 24-hour exposure to a 325 watt mercury arc to examine the solarization resistance of each glass. ASTM method, designation E424-71, was employed to calculate the percent transmission of ground and polished samples having thicknesses normalized to 0.1 inch (2.54 mm).

TABLE I

|  | 1 | 2 | 3 | 4 | 5 | 6 | 7 | 8 | 9 | 10 |
|---|---|---|---|---|---|---|---|---|---|---|
| $SiO_2$ | 62.67 | 63.16 | 64.87 | 65.36 | 64.3 | 64.3 | 56.2 | 60.2 | 64.3 | 64.3 |
| $Al_2O_3$ | 8.27 | 8.27 | 8.25 | 8.26 | 9.1 | 9.1 | 11.1 | 9.1 | 7.1 | 9.1 |
| $Na_2O$ | 16.22 | 16.22 | 7.15 | 7.15 | 8.6 | 6.6 | 10.6 | 10.6 | 10.6 | 10.6 |
| $K_2O$ | 1.62 | 1.62 | 5.49 | 5.49 | 4.6 | 6.6 | 6.6 | 6.6 | 2.6 | 2.6 |
| CaO | 2.85 | 2.85 | 4.60 | 4.61 | 4.5 | 4.5 | 6.5 | 4.5 | 6.5 | 4.5 |
| $B_2O_3$ | 3.53 | 3.53 | 8.87 | 8.87 | 8.2 | 8.2 | 8.2 | 8.2 | 8.2 | 8.2 |
| $Fe_2O_3$ | 0.048 | 0.048 | 0.043 | 0.043 | 0.02 | 0.02 | 0.02 | 0.02 | 0.02 | 0.02 |
| $As_2O_3$ | 0.20 | 0.20 | 0.20 | 0.20 | 0.2 | 0.2 | 0.2 | 0.2 | 0.2 | 0.2 |
| $TiO_2$ | 0.50 | — | 0.50 | — | 0.5 | 0.5 | 0.5 | 0.5 | 0.5 | 0.5 |
| MgO | 4.08 | 4.08 | — | — | — | — | — | — | — | — |

|  | 11 | 12 | 13 | 14 | 15 | 16 | 17 | 18 | F Glass | As Glass |
|---|---|---|---|---|---|---|---|---|---|---|
| $SiO_2$ | 66.2 | 64.3 | 62.2 | 66.2 | 66.0 | 68.2 | 65.6 | 64.3 | 72.4 | 61.5 |
| $Al_2O_3$ | 7.9 | 11.1 | 11.1 | 9.1 | 7.9 | 7.2 | 9.1 | 7.1 | 2.1 | 17.0 |
| $Na_2O$ | 7.3 | 8.6 | 8.6 | 8.6 | 7.3 | 8.6 | 9.3 | 8.6 | 13.6 | 12.6 |
| $K_2O$ | 5.0 | 4.6 | 4.6 | 4.6 | 5.0 | 4.6 | 4.6 | 4.6 | — | 3.4 |
| CaO | 4.5 | 2.5 | 4.5 | 2.5 | 4.5 | 2.5 | 2.5 | 6.5 | 8.6 | 0.4 |
| $B_2O_3$ | 8.9 | 8.2 | 8.2 | 8.2 | 8.9 | 8.2 | 8.2 | 8.2 | — | — |
| $Fe_2O_3$ | 0.02 | 0.02 | 0.02 | 0.02 | 0.04 | 0.02 | 0.02 | 0.02 | 0.12 | 0.065 |
| $As_2O_3$ | — | 0.2 | 0.2 | 0.2 | 0.2 | 0.2 | 0.2 | 0.2 | — | 0.7 |
| $TiO_2$ | — | 0.5 | 0.5 | 0.5 | — | 0.5 | 0.5 | 0.5 | — | 0.75 |
| F | 0.4 | — | — | — | 0.4 | — | — | — | — | — |
| MgO | — | — | — | — | — | — | — | — | 3.2 | 3.7 |

Table II records the softening point (Soft.), annealing point (Ann.), strain point (Str.), and liquidus temperature (Liq.), all in °C, for each exemplary composition. Table II also lists the coefficient of thermal expansion over the range of 0°–300° C. (Exp.) expressed in terms of $\times 10^{-7}$/°C., density (Den.) in grams/cm³, and the results of a powder durability test (Dur.) conducted in water measured in terms of $\times 10^{-4}\%$. The first five tests were carried out utilizing methods conventional in the glass art. The durability test involved immersing a quantity of powder from each sample for four hours in distilled water at 90° C. The test is based upon ASTM The theoretical transmission of the glasses (assuming an average refractive index of 1.50) is 92%.

TABLE II

|  |  | 1 | 2 | 3 | 4 | 5 | 6 | 7 | 8 | 9 | 10 |
|---|---|---|---|---|---|---|---|---|---|---|---|
| Soft. |  | 712 | 705 | 754 | 754 | 740 | 773 | 706 | 710 | 729 | 738 |
| Ann. |  | 542 | 536 | 579 | 577 | 575 | 583 | 560 | 556 | 577 | 574 |
| Str. |  | 503 | 498 | 540 | 539 | 538 | 545 | 528 | 522 | 542 | 539 |
| Exp. |  | 92.8 | 93.6 | 72.6 | 72.3 | 75.4 | 73.6 | 90.9 | 88.6 | 78.4 | 75.7 |
| Dens. |  | 2.472 | 2.491 | 2.447 | 2.441 | 2.455 | 2.418 | 2.507 | 2.492 | 2.487 | 2.459 |
| Liq. |  | 837 | 867 | 933 | 938 | 923 | 866 | 858 | <675 | 903 | 865 |
| Dur. |  | 150 | 160 | — | — | 22 | 15 | 41 | 35 | 31 | 24 |
| Solar |  |  |  |  |  |  |  |  |  |  |  |
|  | Pre | 90.8 | 90.9 | 91.0 | 91.1 | — | — | — | — | — | — |
|  | Post | 90.7 | 90.3 | 90.9 | 90.8 | — | — | — | — | — | — |

|  |  | 11 | 12 | 13 | 14 | 15 | 16 | 17 | 18 | F Glass | AS Glass |
|---|---|---|---|---|---|---|---|---|---|---|---|
| Soft. |  | 745 | 764 | 749 | 748 | 741 | 752 | 750 | 740 | 723 | 870 |
| Ann. |  | 565 | 575 | 579 | 574 | 564 | 577 | 569 | 577 | 539 | 622 |
| Str. |  | 526 | 541 | 543 | 537 | 527 | 540 | 529 | 542 | 496 | 574 |
| Exp. |  | 70.1 | 73.5 | 76.0 | 72.5 | 71.4 | 74.5 | 74.9 | 75.0 | 86 | 88 |
| Dens. |  | 2.423 | — | 2.451 | 2.434 | 2.446 | 2.438 | 2.439 | 2.456 | 2.50 | 2.46 |
| Liq. |  | — | 851 | 932 | <750 | — | <765 | <700 | 948 | — | 1040 |
| Dur. |  | — | 20 | 25 | 20 | — | 20 | 26 | 27 | 400 | 35 |
| Solar |  |  |  |  |  |  |  |  |  |  |  |
|  | Pre | 91.4 | — | — | — | 89.4 | — | 90.9 | — | 85.6 | 90.5 |
|  | Post | 90.4 | — | — | — | 89.0 | — | — | — | 85.9 | 90.5 |

As was observed above, the quantity of nitrate demanded to essentially completely oxidize all the iron present to the $Fe^{+3}$ state can be determined empirically from analyses of the iron content present in the batch ingredients. In general, however, where iron is present in conventional impurity amounts, viz., about 0.1% by weight, at least about 0.5% by weight nitrate, expressed in terms of $NaNO_3$, will be included in the batch. More than about 5% by weight nitrate, expressed in terms of NaNO₃, may be innocuously incorporated into the batch. Nevertheless, such large additions are not only unnecessary as being far in excess of that required to substantially completely oxidize all the iron to the $Fe^{+3}$ state, but also, because sources of nitrates are commonly more expensive than such batch materials as soda ash, large amounts of nitrates raise the cost of the batch and serve no compensating practical purpose. To determine the relative amounts of $Fe^{+2}$ and $Fe^{+3}$ in the final glass, chemical analyses can be conducted colorimetrically utilizing orthophenanthroline.

Table II illustrates the criticality of composition control. Hence, whereas the transmissions of Examples 1 and 2 are satisfactory, the chemical durabilities thereof are not as good as desired. That is, a weight loss equivalent to no more than $100 \times 10^{-4}\%$ is believed desirable. The float glass demonstrates both inferior transmission and durability. The aluminosilicate glass displays good solar transmission but is too hard—a softening point of 870° C., an annealing point of 622° C., and a strain point of 574°.

Example 17 is deemed to constitute the most preferred embodiment of the inventive compositions. To test the resistance of the glass to weathering, a two-inch square thereof was placed into a heated cabinet operating at 50° C. and a relative humidity. After a residence period of 12 weeks, no visible change in appearance was observed even under intense illumination. In contrast, commercial soda-lime glasses are severely degraded in that test after only 4–6 weeks. Example 17 compares very favorably with the chemically resistant borosilicate glasses, for example, Corning 7740 laboratory glassware marketed by Corning Glass Works, Corning, N.Y.

We claim:

1. A glass sheet suitable for use as a solar heliostat glass for a backside reflecting mirror demonstrating a solar transmission (350–2100 nm) through a 2.54 mm thickness in excess of 90%, which has a viscosity at the liquidus in excess of $10^5$ poises, a softening point of no more than about 760° C., an annealing point of no more than about 575° C., and a strain point of no more than about 535° C., which exhibits long term stability against devitrification when in contact with platinum and refractory ceramics, which is virtually unaffected by solarization, and which displays excellent resistance to weathering consisting essentially, expressed in weight percent on the oxide basis as calculated from the batch, of about

| | |
|---|---|
| Al₂O₃ | 7–13 |
| B₂O₃ | 7–10 |
| Na₂O | 6–11 |
| CaO | 2–5 |
| K₂O | 2–7 |
| TiO₂ | 0.1–1 |
| As₂O₃ | 0.2–1 |
| Sb₂O₃ | 0–1 |
| SiO₂ | Balance | and also containing iron in the form of impurities up to 0.1%, expressed in terms of Fe₂O₃, wherein essentially all of the iron is present in the $Fe^{+3}$ state.

2. A glass sheet consisting essentially, expressed in weight percent on the oxide basis as calculated from the batch of about:

| | |
|---|---|
| SiO₂ | 65.6 |
| Al₂O₃ | 9.1 |
| Na₂O | 9.3 |
| K₂O | 4.6 |
| CaO | 2.5 |
| B₂O₃ | 8.2 |
| Fe₂O₃ | 0.02 |
| As₂O₃ | 0.2 |
| TiO₂ | 0.5 |

* * * * *